May 22, 1945.　　　J. T. CAMPBELL　　　2,376,416
ENLARGING AND REDUCING CAMERA
Filed Sept. 24, 1942　　　5 Sheets-Sheet 1

INVENTOR.
James T. Campbell
BY Robert A. Sloman
ATTORNEY

May 22, 1945.  J. T. CAMPBELL  2,376,416
ENLARGING AND REDUCING CAMERA
Filed Sept. 24, 1942   5 Sheets-Sheet 2
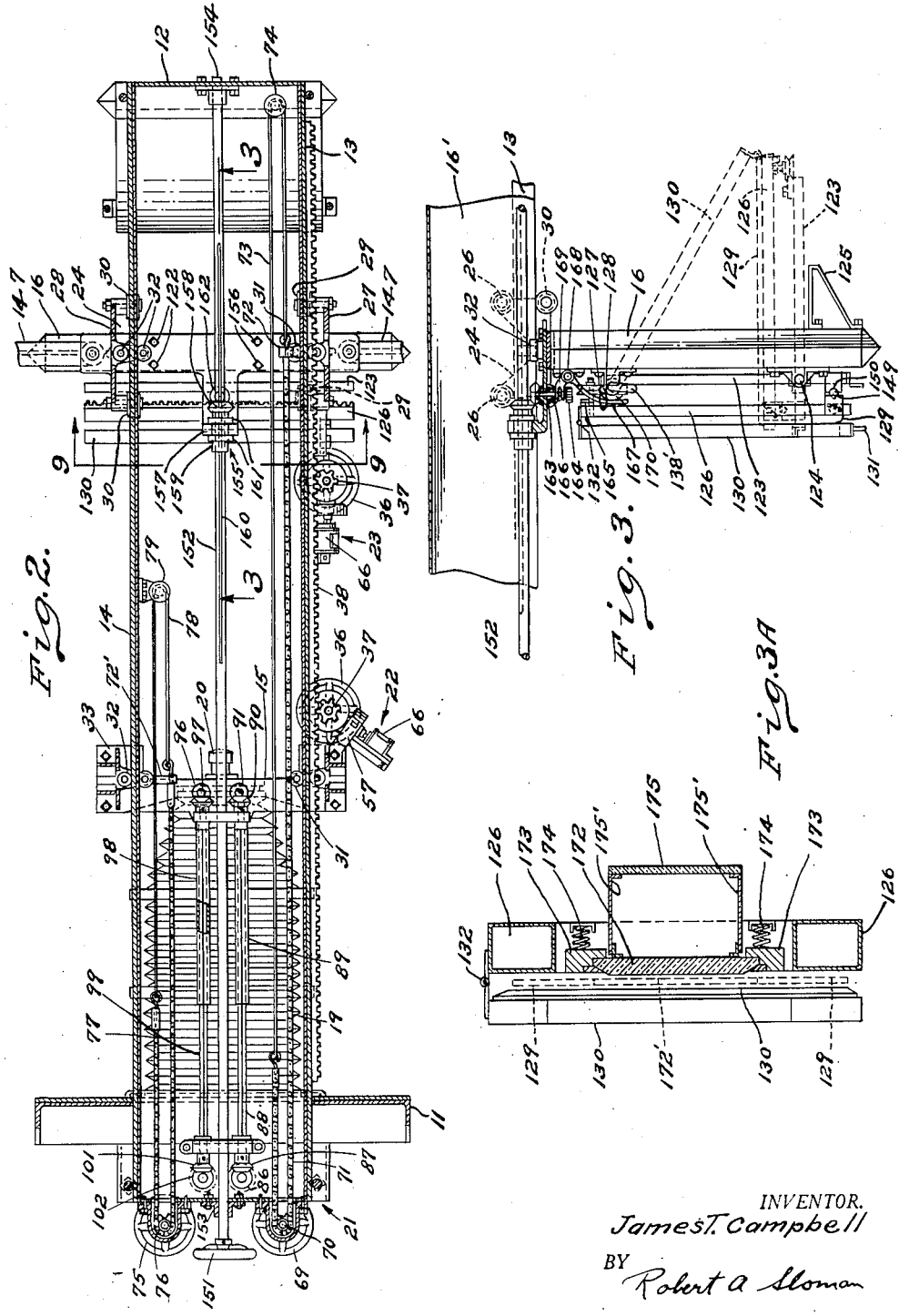
INVENTOR.
James T. Campbell
BY Robert A. Sloman
ATTORNEY May 22, 1945.  J. T. CAMPBELL  2,376,416
ENLARGING AND REDUCING CAMERA
Filed Sept. 24, 1942  5 Sheets-Sheet 3
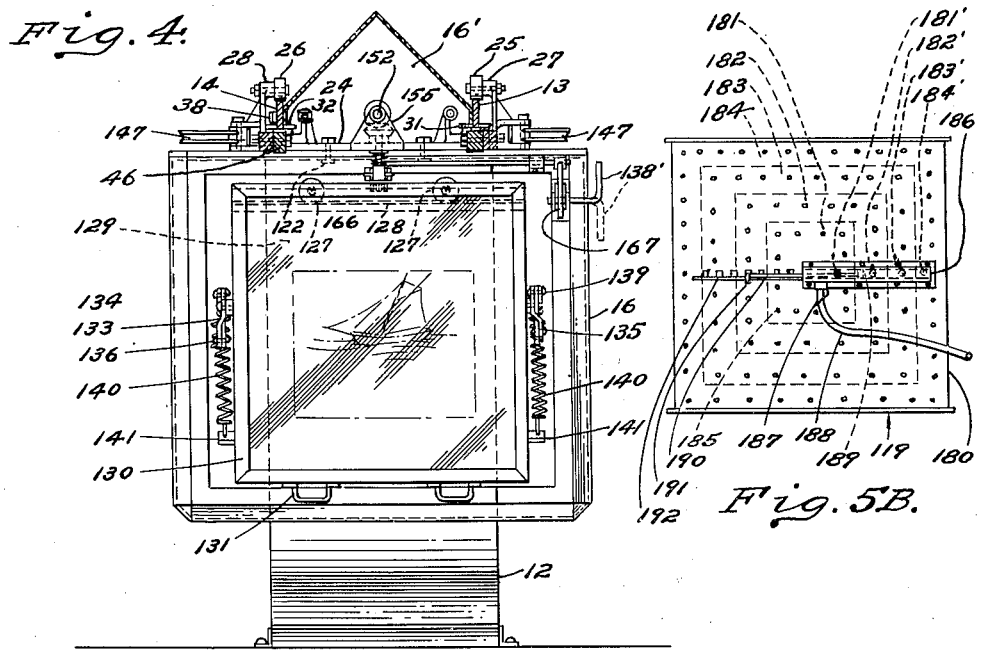
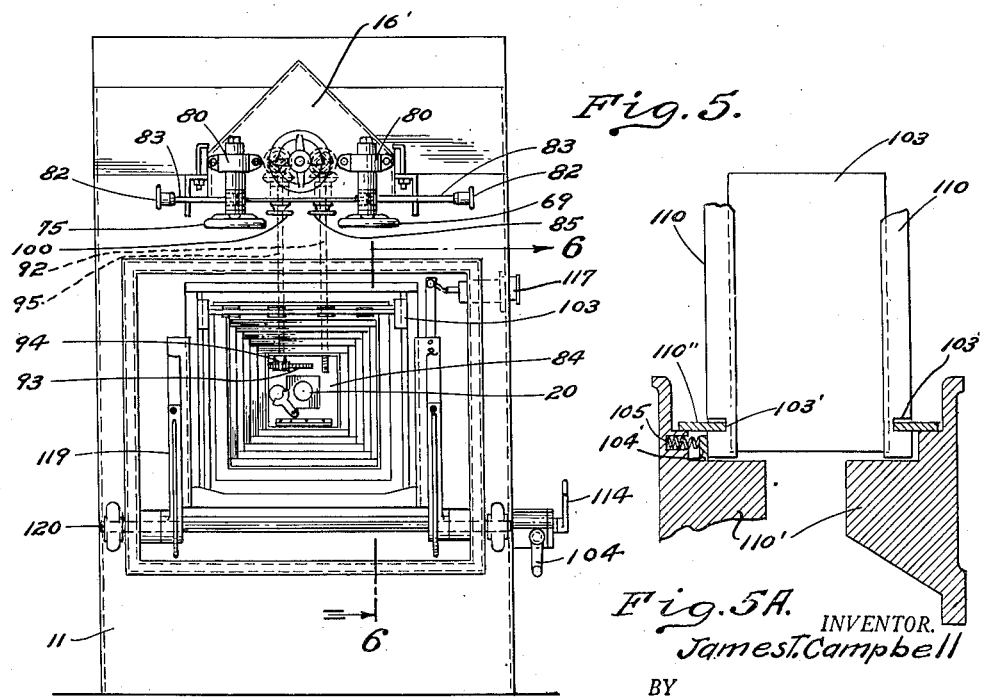
INVENTOR.
James T. Campbell
BY
Robert A. Sloman
ATTORNEY

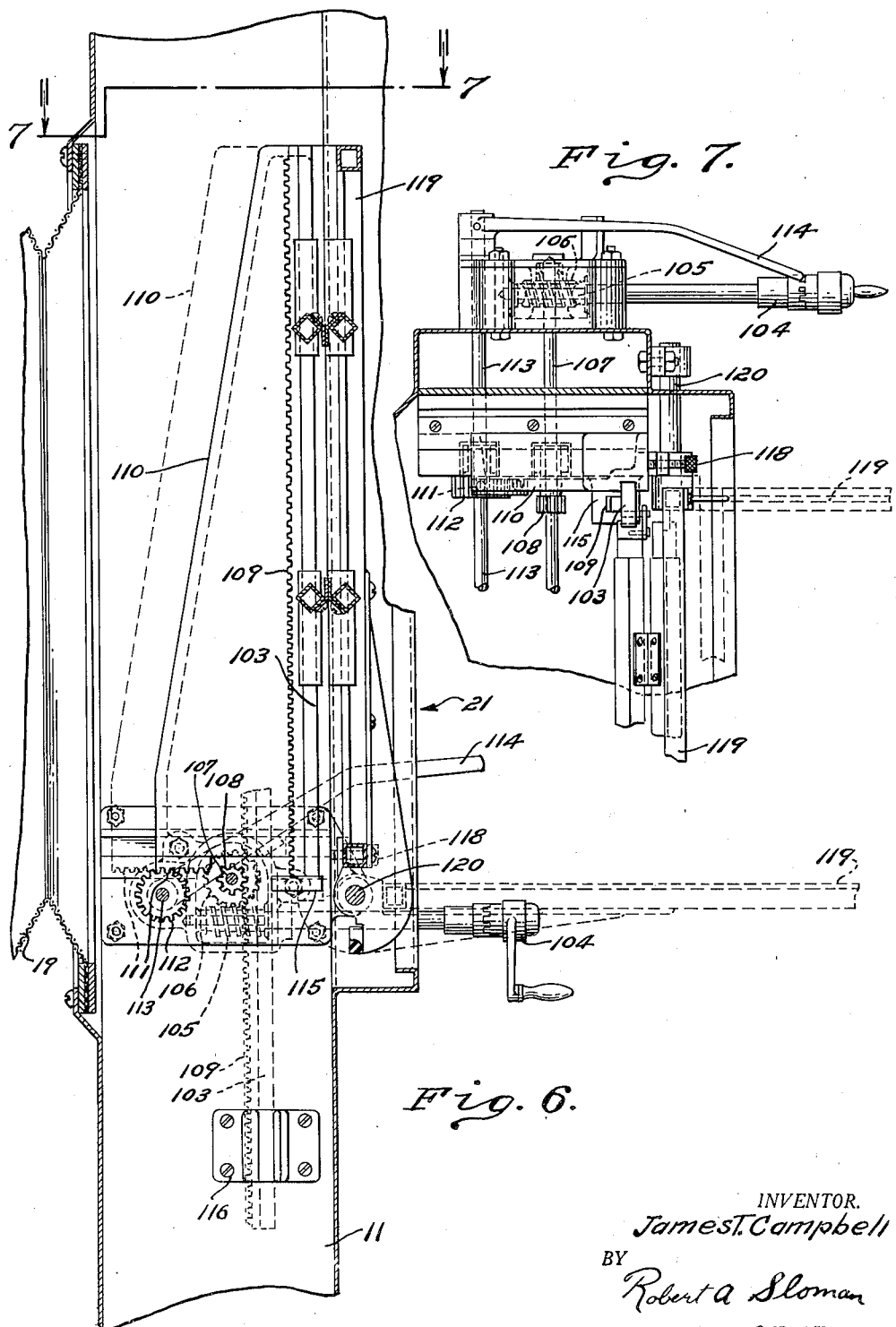

May 22, 1945. J. T. CAMPBELL 2,376,416
ENLARGING AND REDUCING CAMERA
Filed Sept. 24, 1942 5 Sheets-Sheet 5

INVENTOR.
James T. Campbell
BY
Robert A. Sloman
ATTORNEY

Patented May 22, 1945

2,376,416

UNITED STATES PATENT OFFICE 2,376,416

ENLARGING AND REDUCING CAMERA

James T. Campbell, Detroit, Mich.

Application September 24, 1942, Serial No. 459,591

5 Claims. (Cl. 88—24)

This invention relates to a camera and more particularly to a camera embodying a longitudinally adjustable lens holder section and copy board section, suspended and supported by a suitable reinforced frame, and by oppositely disposed end supporting members.

It is the object of this invention to provide in such a camera, manually operable adjusting means adjacent said sections for respectively governing accurately the longitudinal positioning or focusing of said lens section and said copy board section.

It is the object of this invention to provide operating means forming a part of said adjusting means for definitely setting both of said frames in any predetermined position.

It is the object of this invention to also provide remote manually operable control means for respectively regulating the longitudinal adjustments or focusing of said lens and copy board sections.

It is a further object of this invention to provide manually operable controls for vertical and horizontal adjustment of the lens holder within and with respect to the lens holder section.

It is a further object of this invention to provide within said copy board section glass and blanket contact printing frames, which are also adapted for use in supporting a picture sought to be photographed.

It is a further object of this invention to provide remote manually operable means for transversely adjusting said frames within said copy board section.

It is a further object herein to provide therewith a source of vacuum to the space between said glass and blanket frames whereby the picture placed therein to be photographed may be given a thorough contact throughout its surface with the surface of the glass frames.

It is a still further object herein to provide means for making positive prints from negative prints by employing the above glass and blanket frames.

It is a still further object herein to provide a plate or film holder section within one of the camera supports, with means therein for supporting photographic screens, and manually operable means for raising and lowering said screen supports within said plate holder section.

It is a still further object of this invention to provide a film or plate holder within said section pivotally mounted therein, together with suitable vacuum or other means for securing a film or sensitized plate to said plate holder.

It is a still further object herein to provide a manually operable means for regulating the screen separation or distance between said plate and the photographic screen, together with means for accurately measuring said distance.

It is a still further object of this invention to provide an adjustable valve for governing the extent of vacuum to which the surface of said plate holder may be subjected.

These and other objects will be seen in the invention hereinafter described which relates to the various elements and their combinations as illustrated in the accompanying drawings in which:

Fig. 2 is a section on line 2—2 of Fig. 1.

Fig. 3 is a section on line 3—3 of Fig. 2.

Fig. 3A is an enlarged fragmentary end sectional view of the blanket and glass frames.

Fig. 4 is a section on line 4—4 of Fig. 1.

Fig. 5 is an end elevational view of the camera.

Fig. 5A is a fragmentary front sectional view of the screen holder support.

Fig. 5B is a front elevational view of the vacuum film holder.

Fig. 6 is a section on line 6—6 of Fig. 5.

Fig. 7 is a section on line 7—7 of Fig. 6.

Figure 1:
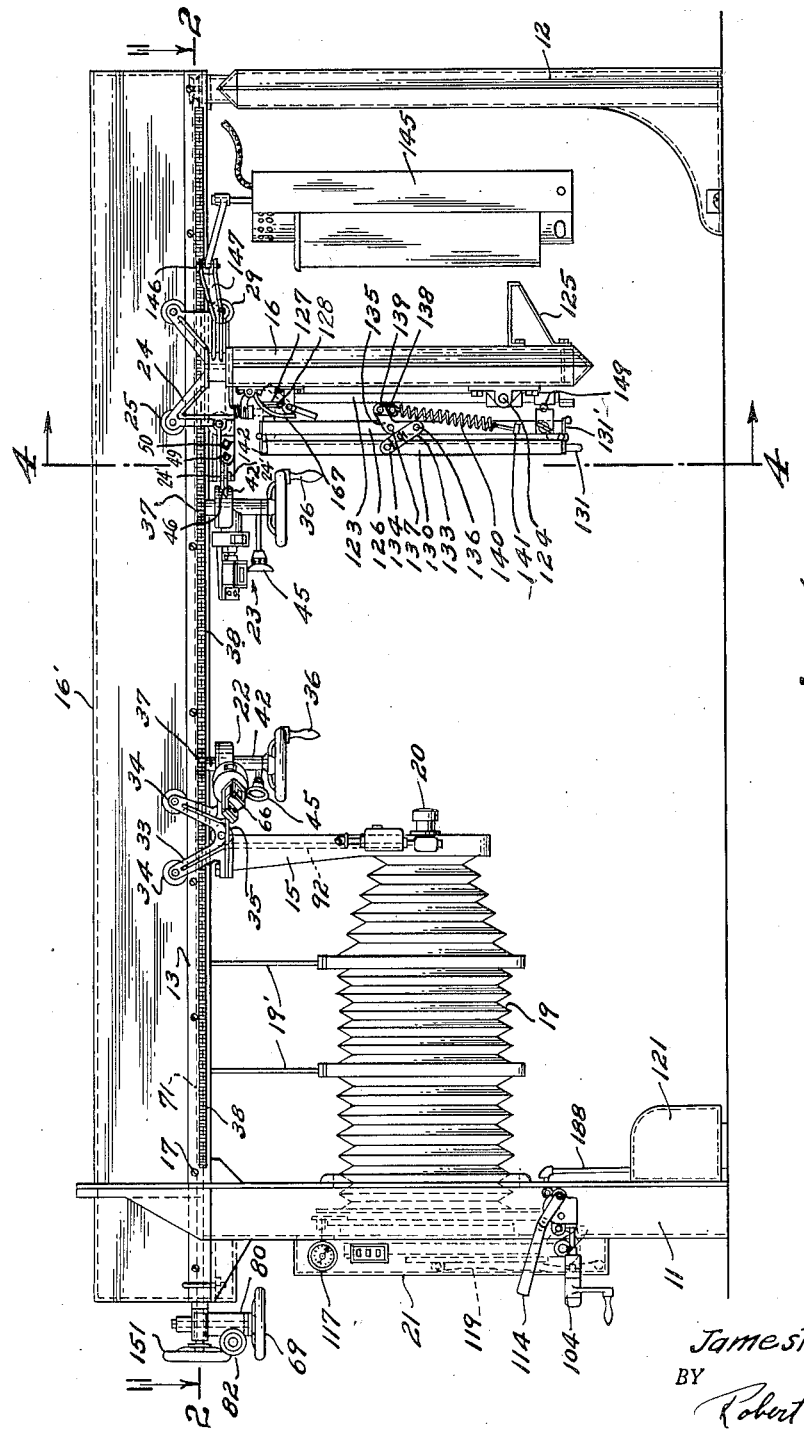
Fig. 1 is a side elevational view of the camera.

It will be understood that the above drawings illustrate merely a preferable embodiment of the present invention, and that other embodiments are also intended within the scope of the claims hereinafter set out.

Referring to the drawings, in Fig. 1 the camera consists of the hollow upright frames 11 and 12 upon which are secured tracks 13 and 14 for supporting the camera lens section 15 and copy section 16 in the manner more fully set out hereinafter. A reinforcing inverted V-shaped member 16' is bolted to tracks 13 and 14 at points 17 and 18 for maintaining rigidity of the camera and eliminating any possible sway thereof.

Extensible bellows 19 are interposed between the upright member 11 and section 15 providing light communication between the camera lens 20 and the film holder section generally indicated at 21. Said bellows are further intermediately supported by the longitudinally movable centrally supported members 19'.

Copy board section 16 is adapted to hold the picture or subject matter which may be sought to be photographed. Consequently it is seen for obtaining various sizes of photographs from various sizes of subject matter or for reducing or enlarging the same, that both frames 15 and 16 must be longitudinally adjusted or focused with respect to each other and with respect to the film holder section 21.

These various distances may be predetermined so that for any given reproduction requirements, sections 15 and 16 may be manually adjusted accurately, and this by means of suitable indicating means 22 and 23 hereinafter more fully described.

Figure 9:
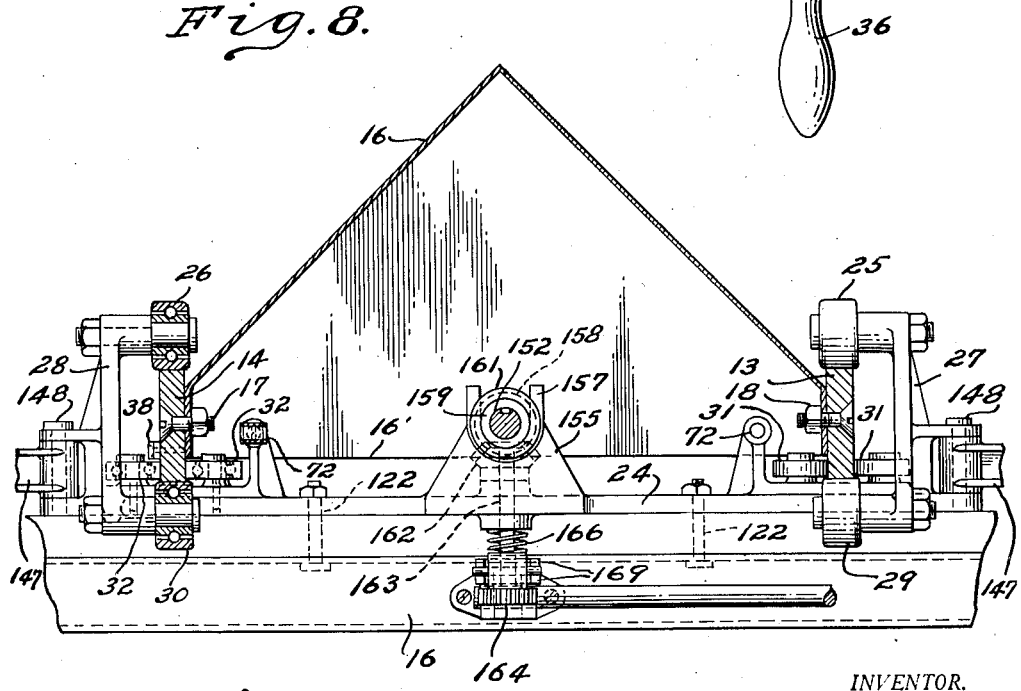
Fig. 9 is a section on line 9—9 of Fig. 2.

Referring to Fig. 9, section 16 is joined to carriage 24, which is slidably mounted upon tracks 13 and 14 by means of roller bearing members 25 and 26 which respectively engage and roll thereon.

Brackets 27 and 28 forming a part of carriage 24 provide a journal for rollers 25 and 26, and also for the cooperating rollers 29 and 30 which are adapted to engage the under surfaces of tracks 13 and 14 respectively for maintaining said carriage firmly thereon.

Additional guiding rollers 31 and 32 are also journaled by said carriage for cooperatively engaging the opposite edges of said tracks thereby definitely maintaining the direction of reciprocable movement of said carriage.

In a similar manner carriage 33 joined to section 15 is adapted for reciprocable adjustment upon tracks 13 and 14 by suitable rollers 34. The rollers for track 14 are not shown; however the construction is substantially similar to the carriage shown in section in Fig. 9.

It will be noted however, that single rollers 35 are also journaled below carriage 33 for engaging the under side of the tracks 13 and 14, while carriage 24 utilizes two pair of such rollers. In any event the carriages 24 and 33 provide a sliding support for the lens section 15 and the copy holder section 16, permitting any desired longitudinal adjustment thereof between the upright camera supporting members 11 and 12.

Both carriages have joined thereto the similar manually actuating focusing mechanisms 36 for turning the spur gears 37 which are at all times in engagement with the rack 38 which is longitudinally disposed upon the outside of track 13. This structure is shown in detail in Fig. 8, and generally in Fig. 1.

Figure 8:
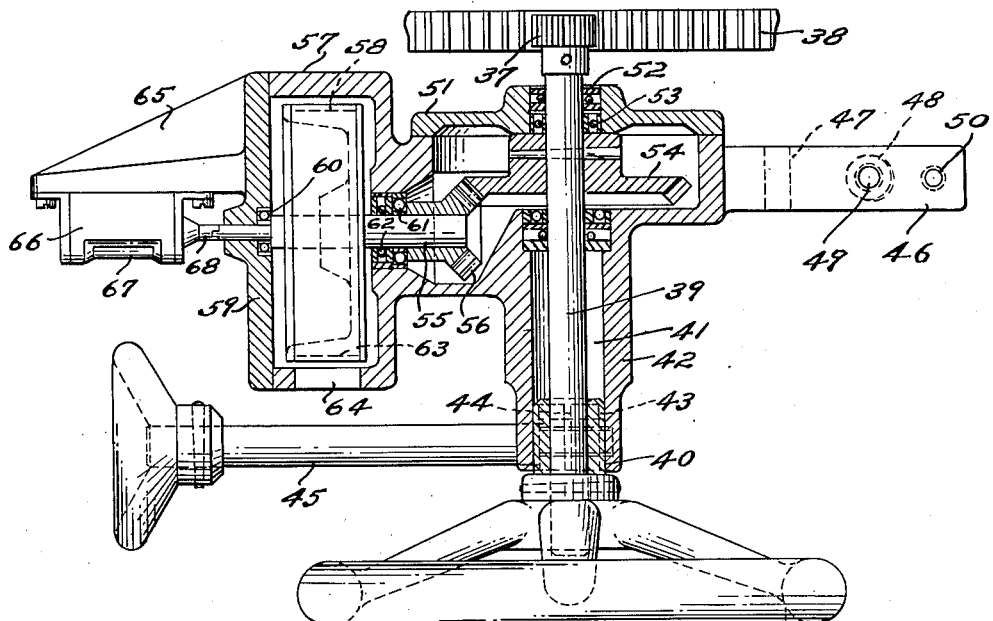
Fig. 8 is a partially sectioned view through the center of the manual section adjusting or focusing means.

In Fig. 8 the actuating means 36 directly turns the shaft 39 on the end of which is the spur gear 37. Shaft 39 has a bushing 40 keyed thereon adapted to revolve within the opening 41 of housing 42. The opposite side of housing 42 adjacent said bushing has a collar 43 thereon which is vertically slit at 44 and adapted to be compressed to frictionally engage said bushing whenever it is desired to lock the focusing mechanism. The manually operable shaft 45 is rotatably secured to one side of said collar and threadedly joined to the other so that handle 36 may be locked in any adjusted position.

Housing 42 carried by carriages 24 and 33 respectively has a mounting bracket 46 thereon which is pivotally joined thereto at point 47 by suitable dowel pins, as shown in Figs. 1 and 8. As shown in Fig. 1 the extending base portion of carriage 24 has a pair of outwardly extending ears 24' in spaced relation with a central transverse opening therethrough for retaining a suitable pivot pin for pivotally journalling at 47 bracket member 46 which is provisioned between said ears. Opening 48 has a coil spring seated therein and engaging said carriages for resiliently maintaining gear 37 in cooperative engagement with the rack gear 38; and a suitable tension screw 49 is provided for regulating the tension of said spring.

A stop screw 50 is also provided which is intended to prevent gear 37 from disengaging the rack gear 38.

The hollow cover member 51 secured to the top of housing 42 centrally supports the oil seal 52 and the bearing members 53; and also forms a gear housing for beveled gear 54 keyed to shaft 39.

Housing 42 also has a shaft 55 rotatably journaled therein with a beveled gear 56 on one end in cooperative engagement with beveled gear 54.

Cylindrical housing 57 forms a part of housing 42 and is adapted to house the rotatable drum 58 which is secured to the rotatable shaft 55. A cover member 59 is provided for housing 57 and a support for the gear 60 for shaft 55. A suitable bearing 61 is also provided for the other end thereof and also an oil seal 62.

Drum 58 has a scale 63 thereon divided into a hundred divisions, each graduation measuring (.006") six thousandths of an inch movement of either carriage 24 or 33. Said drum makes four revolutions for every one revolution of wheel 36. Visual access to said scale is obtained through opening 64 in housing 57.

A bracket 65 forming a part of cover 59 supports a mechanism 66 for counting the revolutions of the drum 58 through the window 67. Spindle 68 of said counter is operably connected to shaft 55.

The portion of the camera between the supports 11 and 12 is outside of the dark room and the focusing mechanism 22 and 23 therefore must be operated outside said room. However additional focusing mechanisms are also provided on the outside of support 11 in the dark room adapted to regulate longitudinal movement of the carriages 24 and 33, as best seen in Figs. 2 and 5.

Hand wheel 69 on the outside of support 11 turns a shaft on which is secured a sprocket gear 70. A sprocket chain 71 meshes with said gear and extends longitudinally adjacent member 16' and is secured to the upwardly extending bracket 72 of carriage 24 as best seen in Fig. 9. Fig. 2 shows a cable 73 joined on the other side of said bracket and extending as far as the camera support 12 where it is returned around a suitable pulley 74 and extends back longitudinally until it meets and is secured to the other end of the sprocket chain 71. Thus on manipulation of wheel 69 carriage 24 may be reciprocated longitudinally from within the dark room.

In a similar manner hand wheel 75 on the outside of support 11 turns a shaft on which is secured a sprocket gear 76. A sprocket chain 77 meshes with said gear and extends longitudinally parallel to the sprocket chain 71 and is joined to bracket 72' of carriage 33 in the same manner as the sprocket chain 71 is joined to carriage 24. A cable 78 extends from the other side thereof and is supported by the pulley 79 whence it is returned to the other end of sprocket chain 77. Thus it is seen that manipulation of hand wheel 75 will govern longitudinal movement carriage 33 and the lens frame depending therefrom.

Housings 80 for the shafts rotated by hand wheels 69 and 75, have split portions therein where by means of handles 82 and shafts 83 threaded into one side of said split portions respectively said hand wheels may be locked in any selected position, for locking sections 15 and 16 in position.

Lens 20 is secured to a lens plate 84 which is adapted for vertical and horizontal adjustment. Vertical adjustment is accomplished through the hand wheel 85 which turns a shaft on which is a bevel pinion gear 86 in mesh with a similar gear 87 on the end of a rotatable square shaft 88. A hollow square shaft 89 is slidably mounted thereon to turn therewith, and with a pinion gear 90 on its outer end in mesh with a similar gear 91 for turning the vertical shaft 92 disposed within the lens frame 15.

The lower end of shaft 92 threadedly engages a suitable slide member for vertical adjustment thereof, upon which the lens plate 84 is also mounted for horizontal adjustment thereon. While the slide is thus adapted for vertical adjustment through hand wheel 85, it is intended that the lens plate itself be adapted for horizontal adjustment on said slide.

This is accomplished through the rack gear 93 on lens plate 84 which is engaged by the rotatable spur gear 94 on the end of the vertical shaft 95 also disposed within the lens section 15. The upper end of said shaft has a bevel gear 96 thereon in mesh with a similar bevel gear 97 on the end of a hollow rotatable square shaft 98. The latter shaft is slidably mounted upon the rotatable square shaft 99 which is itself actuated by the hand wheel 100 and the two intermediate intermeshing gears 101 and 102. Thus by manual operation of hand wheels 85 and 100 vertical as well as horizontal adjustment of the lens plate 84 can be obtained.

The plate section 21 forming a part of the camera support 11, is seen in Figs. 1, 5, 6 and 7, and has therein a vertically adjustable screen holder 103 for supporting any desired screen when required to obtain a predetermined number of dots per square inch upon the picture which is sought to be printed. Certain types of photographs such as line work do not require the use of a screen, and in that event the screen may be lowered.

Raising and lowering of said screen support is accomplished by means of a manually rotated shaft 104 projecting in front of the film holder section 21 and having on its end a worm 106 which meshes with a cooperating worm gear 105 on the end of a rotatable shaft 107 which lies in a plane parallel to the plane of the screen holder 103 best seen in Fig. 7.

Spur gears 108 are keyed on said shaft in spaced relation for cooperative engagement with the two vertically disposed rack gears 109 which are secured to the back surfaces of the screen frame. Thus by actuating handle 104 screen frame 103 may be raised and lowered.

Under normal conditions with the screen being used in elevated position, said screen support may be adjusted horizontally with respect to the film plate or support hereinafter described in detail. The distance between the screen and this plate is called the screen separation which is normally measured in thousandths of an inch. This distance is often varied depending upon the particular reproduction conditions desired, and also upon the screen ruling or number of lines per inch. And to this end the screen supporting frame is mounted within longitudinally adjustable supports 110 having upon their bottom surfaces the rack gears 111 which are enmeshed with suitable spur gears 112 on the rotatable shaft 113.

Shaft 113 transversely journaled and disposed in a plane parallel to the shaft 107 is rotatably actuated by the lever 114 on the end thereof. Reciprocable movement of said lever thereto causes reciprocable movement of the screen frame supports thus regulating the screen separation heretofore explained.

It will be noted that the screen support 103 normally rests upon the horizontal seat members 115 which maintain said frames in a fixed vertical position. So disposed it is seen that rack gears 109 are out of engagement with their operating gears 108 as best seen in Fig. 7.

Before frame 103 can be lowered the lever 114 must be raised thus causing a horizontal translation of the frame supports 110. As the rack gears 109 are thus moved into cooperating relation with their gears 108, it will be seen that the frame 103 has cleared the rest members 115 and is now free to be lowered; and not before this clearance is obtained can this operation be accomplished. Fig. 6 shows the guide members 116 for the screen frame 103.

Frame supports 110, as in Fig. 5A, move longitudinally upon the housing members 110' while gib members 110'' supported by said housing are nested within slots 103' in said supports for guiding said movement. A wear plate 104' is also supported by housing 110' adapted to engage the edge of the support 110 with a suitable coiled take up spring 105' interposed between said support and said housing. In this manner any wear is immediately taken up thereby maintaining the proper positioning of said supports 110 and the screen members 103.

A dial indicator 117 is secured to the side of upright supporting member 11 and is adapted for accurately measuring the screen separation in thousandths of an inch. An adaptor is also used for measuring distances greater than one inch. A suitable stop 118 is also provided which can be manually set after the screen separation is once fixed for a given job. In this way if the frame support 110 is manually adjusted to permit lowering of the frames, said supports can be moved back to their original position corresponding to the position of the pre-set stop.

A plate holder 119 pivotally mounted on a rotatable shaft 120 at its lower edge is adapted to tilt open approximately 90 degrees in order to permit the proper placing thereon of a suitable plate or other sensitized surface.

A suitable spring counter balance, not shown in the drawings, is employed for resiliently maintaining said plate holder tightly closed against suitable stops when in photographing position. The plate holder may have removably secured thereto any of several types of film holding or plate holding devices. For instance, a "stay flat" may be employed when the film is stuck directly to the plate holder by a suitable fluid.

On the other hand a vacuum film holder may be attached to the pivotal plate holder 119, as shown in Fig. 5B, consisting of hollow rectangular frame member 180 with a plurality of rectangular concentric vacuum compartments 181, 182, 183 and 184. Each compartment has on the opposite side of member 180 a plurality of rectangularly arranged air openings 185.

The hollow cylindrical member 186 is suitably secured on the outside of frame 180, with a plurality of air inlet openings 181', 182', 183' and 184' respectively communicating with each of the compartments 181, 182, 183 and 184.

An outlet opening 187 is provisioned within cylinder 186 to which is joined a flexible conduit 188, which is itself in communication with a suitable vacuum source such as a vacuum pump within the base portion 121 of the camera support 11 as shown in Fig. 1.

A manually operable valve is provided comprised of a plunger 189 reciprocably mounted within cylinder 186 and adapted on movement thereof to progressively provide vacuum communication to each of the openings 182', 183', and 184' respectively, opening 181 being at all times in communication with the vacuum source.

A shaft 190 is joined to plunger 189 with a handle 191 pivotally mounted on the end thereof for manually adjusting the position of said plunger within the vacuum cylinder 186. A notched scale 192 extends parallel to shaft 190, and handle 191 is adapted to be pivoted into any desired notch therein for locking the valve adjustment in any position.

The film employed is placed upon the opposite side of frame 180 when the latter is tilted into horizontal position upon the tiltable plate holder 119. The vacuum source available to the selected compartments 181, 182, 183 or 184, communicates with the under surface of the film employed through the openings 185 thereby holding said film firmly against the frame 180; or in other words permitting atmospheric pressure on the other side of said film to do the work.

Valve 189 is then adjusted according to the size of the film employed. For a larger film the plunger 189 is moved to the extreme right. In this position vacuum is available in all of the compartments 181, 182, 183 and 184.

The longitudinally adjustable carriage 24 has depending therefrom the copy frame 16 secured thereto by bolts 122, best seen in Fig. 9. Said frame is substantially rectangular and hollow, being adapted to receive the printing frames, hereinafter described, when in tilted position as shown in Fig. 3.

A supporting frame member 123 is pivotally journaled near its lower end to the copy section 16 at points 124, and is adapted to assume the tilted position shown in Fig. 3, supported by the rests 125 secured to the rear surface of the copy section 16.

A blanket frame 126 is slidably suspended from the top of the supporting frame 123 by pulleys 127 rotatably journaled from the side of the blanket frame, and adapted to ride in or cooperate with the inverted V channel 128 disposed on said supporting frame 123. Said frame 126 has positioned therein a yielding resilient blanket 129 or mat being of any suitable material such as rubber.

A glass frame 130 with operating handles 131 at its lower edge, is pivotally joined along its top edge at 132 to the top edge of the blanket frame 126, and is adapted to assume the relative position shown by the dotted lines in Fig. 3. However suitable stops are adjustably secured within blanket frame 126 so that the glass frame when closed is always in an exact vertical position. It will be noted also that clamps 131' are secured to the bottom of blanket frame 126 for manual attachment to the bottom edge of glass frame 130.

A toggle linkage is interposed between frames 126 and 130 consisting of a lever 133 pivoted to the glass frame at 134 and to the cantilever 135 at point 136. Said cantilever is centrally pivoted at 137 to the blanket frame 126, with its other end pivoted to the link 138 at point 139.

The toggle arrangement is completed by the coiled spring 140 joined to link 138 and also joined to the blanket frame at the point 141.

The above toggle is adapted to aid in tightly closing the glass frame with respect to the blanket frame after the former is partially closed. Also said toggle is adapted to aid in opening the glass frame with respect to said blanket frame after the former is partially opened.

In photographing a picture or other subject matter the same is centrally placed upon the open blanket frame 126 shown in dotted lines in Fig. 3. The upper glass frame 130 is then closed tightly by means of the above described toggle arrangement and suitable clamps 131'.

The two frames 126 and 130 are then pivoted into vertical position so that the picture is in line with the lens 20 of the camera.

Suitable illuminating means 145 are provided pivotally suspended at 146 to the supporting bracket 147 which is itself pivoted to the carriage 24 at points 148, best seen in Fig. 9. Though not shown in the drawings it may be desired to use two sources of illumination; and in that case the second source would be pivotally mounted to the other bracket 147 fragmentarily shown in Fig. 9. In taking the photograph the illuminating means may be pivoted around into any desired position for directing light upon the picture.

Referring to Figs. 1 and 3 the two frames 126 and 130 are slidably supported by the pulleys 127 as above described, and the bottom edge of the blanket frame 126 has ball bearing members 149 interposed between said frames and a transverse V groove 150 in the supporting frame 123.

By this construction it is seen that frames 126 and 130 when together in vertical position only, may be laterally adjusted or translated with respect to the copy section 16. Lateral adjustment of said frames may also be accomplished manually remote therefrom, on the outside of the camera supporting member 11.

A hand wheel 151 is provisioned on the end of a rotatable shaft 152 journaled at 153 in reinforcing frame 16' and extending longitudinally throughout the entire length of the camera and suitably journaled at 154 in the other end of said frame 16'.

A bracket 155 bolted to carriage 24 at points 156 extends outwardly providing a forked or bifurcated portion 157 within which is journaled the beveled gear 158 and its hollow shaft 159 which is slidably journaled on the rotatable shaft 152 along a splined portion thereof 160.

Hollow shaft 159 has the two annular shoulders 161 between which is disposed the forked member 157, whereby it is seen that any longitudinal adjustment of the carriage 24 causes a corresponding movement of the beveled gear 158 upon the shaft 152.

Beveled gear 162 on the downwardly depending shaft 163 meshes with beveled gear 158. A spur gear 164 slidably disposed near the lower end of the shaft 163 is adapted to operatively engage the rack gear 165 secured upon the back surface of the blanket frame 126 at the top thereof. Thus on actuating hand wheel 151 it is seen that blanket frame 126 and the glass frame 130 may be laterally adjusted with respect to the copy section 16.

However it will be noted that spur gear 164 must be manually elevated in order to permit tilting of the frames 126 and 130. To this end a coiled spring 166 is secured on shaft 163 to normally maintain a slidable spur gear 164 in operative engagement with the rack gear 165.

Cantilever 167 pivotally mounted at 168 to the copy section 16, has a forked end 169 adapted to engage the shaft 163 for lifting the same when the opposite end of said cantilever is tilted in a clockwise direction.

This tilting is accomplished by a rotatable cam 170 mounted upon a suitable shaft for operative engagement with cantilever 167. Hand lever 138' is disposed upon the end of said cam shaft for rotating the same for lifting the spur gear 164 out of operative relation with respect to the rack gear 165.

It will be noted that frames 126 and 130 may be used for making positive prints from negatives. To this end the resilient blanket 129 in the blanket frame 126 is removable.

Referring to Fig. 3A a glass plate 172 is supported in the blanket frame 126 within its own frame 173, which is resiliently maintained against the rear surface of the glass 130 by coiled springs 174. A negative 172' is interposed between the glass plate 172 and the glass 130 and resiliently held there by said springs 174.

A light diffusing glass plate 175 is secured to the hollow light conducting member 175' on the back of the frame 173. The illuminating means 145 in this case is pivoted around so that light is directed toward said diffusing plate for a predetermined period of time. In this way a positive may be photographed directly from a negative.

Having described my invention, reference should now be had to the claims which follow for determining the scope thereof.

I claim:

1. A camera comprised of upright supporting means in spaced relation, a longitudinally disposed track on said means, carriages slidably supported upon said track, a lens carrying section joined to and depending from a carriage, a bellows between said section and one of said means, a copy section joined to and depending from another carriage in spaced relation to said lens section, a rack gear longitudinally disposed on said track, manually operable focusing means pivotally supported by each of said carriages with operating means adapted to engage said rack, and resilient means interposed between said focusing means and said carriages for maintaining said operating means in engagement with said rack.

2. In a camera, upright supporting means in spaced relation, a longitudinally disposed track on said means, carriages slidably supported upon said track, a lens carrying section depending from a carriage, a plate holder mounted on one of said supporting means, a copy section depending from another carriage in spaced relation to said lens section, a photographic screen frame in spaced relation to said film holder, a rack gear on the bottom of said screen frame, a manually rotatable spur gear engageable therewith for varying the amount of said latter spaced relation, a rack gear on a longitudinal edge of said screen frame, and a manually rotatable spur gear adapted to engage said latter rack gear for raising or lowering said screen frame relative to said plate holder.

3. In a camera, upright supporting means in spaced relation, a longitudinally disposed track on said means, carriages slidably supported upon said track, a lens carrying section depending from a carriage, a copy section depending from another carriage in spaced relation to said lens section, a vertically disposed supporting frame pivotally mounted upon said copy section and adapted to be pivoted into horizontal position, a horizontal channel member supported by said frame, a blanket frame in spaced relation to said channel member, annularly grooved rollers rotatably carried by said blanket frame and extending therefrom rotatably mounted upon said channel member, adapted to lateral transverse adjustments thereon, and a cooperating glass frame pivotally mounted at the top of said blanket frame adapted to tilting opening movement with respect thereto.

4. In a camera, upright supporting means in spaced relation, a longitudinally disposed track on said means, carriages slidably supported upon said track, a lens carrying section depending from a carriage, a plate holder mounted on one of said supporting means, a copy section depending from another carriage in spaced relation to said lens section, a photographic screen frame in spaced relation to said film holder, a rack gear on the bottom of said screen frame, a manually rotatable spur gear engagable therewith for varying the amount of said latter spaced relation, a rack gear on a longitudinal edge of said screen frame, a manually rotatable spur gear adapted to engage said latter rack gear for raising or lowering said screen frame relative to said plate holder, and supporting means preventing lowering of said screen frame until said manually operable means provides a predetermined spaced relation between said frame and film holder.

5. The combination, a pivotal film holder, means for conducting vacuum to the surface of said film holder for securely holding a film thereon, said film holder having a plurality of concentric compartments in communication with the film side of said holder, a vacuum control cylinder on the outside of said holder in communication with said conduit, and a manually slidable plunger within said cylinder, adapted to progressively establish vacuum communication to one or more of said compartments.

JAMES T. CAMPBELL.